United States Patent [19]
Kimura et al.

[11] Patent Number: 5,779,283
[45] Date of Patent: Jul. 14, 1998

[54] PIPE JOINT UNIT

[75] Inventors: Yoshitsugu Kimura; Motonori Onoshi; Yasuharu Sakaguchi; Keitaro Watanabe, all of Osaka, Japan

[73] Assignee: Takenaka Corporation, Osaka, Japan

[21] Appl. No.: 630,611

[22] Filed: Apr. 10, 1996

[51] Int. Cl.$^6$ .................................................. F16L 37/12
[52] U.S. Cl. ........................... 285/305; 285/382; 285/403; 403/282; 403/378
[58] Field of Search ............................ 285/305, 403, 285/404, 382, 371; 403/282, 284, 378

[56] References Cited

U.S. PATENT DOCUMENTS

| | | | |
|---|---|---|---|
| 2,013,660 | 9/1935 | Lauer | 285/305 |
| 2,108,265 | 2/1938 | Martin et al. | 285/305 X |
| 2,127,284 | 8/1938 | Board | 285/305 X |
| 3,253,841 | 5/1966 | Ahmad | 285/371 X |
| 3,822,074 | 7/1974 | Welcker | 285/305 |
| 4,519,637 | 5/1985 | Folkers | 285/371 X |
| 5,040,831 | 8/1991 | Lewis | 285/305 |

FOREIGN PATENT DOCUMENTS

| | | | |
|---|---|---|---|
| 580775 | 7/1933 | Germany | 285/371 |
| 2143714 | 3/1973 | Germany | 285/305 |
| 56291 | 1/1993 | Japan . | |
| 682590 | 2/1990 | Switzerland . | |
| 631745 | 11/1949 | United Kingdom | 285/403 |

*Primary Examiner*—Dave W. Arola
*Attorney, Agent, or Firm*—Price, Gess & Ubell

[57] ABSTRACT

A pipe joint unit having key members which are struck to bite the surfaces of the pipes is provided with which the pipes can easily and quickly be joined to the body of the pipe joint unit with small force, without skill and regardless of the person who drive the key member. The pipe joint unit according to the present invention includes a body of the pipe joint unit having through holes each of which faces a portion of an inserted pipe in a direction of a tangent line; and key members to be driven into the through holes, wherein each of the key members has a tapered portion which is brought into contact with the surface of the pipe in an initial stage of a driving operation and which bites the surface of the pipe as the driving operation proceeds, and a secured portion to be secured to the bitten portion.

23 Claims, 8 Drawing Sheets

PIPE JOINT UNIT

BACKGROUND OF THE INVENTION

1. Field of the Invention

The present invention relates to a joint unit adaptable to a variety of pipes, such as steel pipes, stainless steel pipes, copper pipes and pipes made of synthetic resin.

2. Related Background Art

Figure 19:
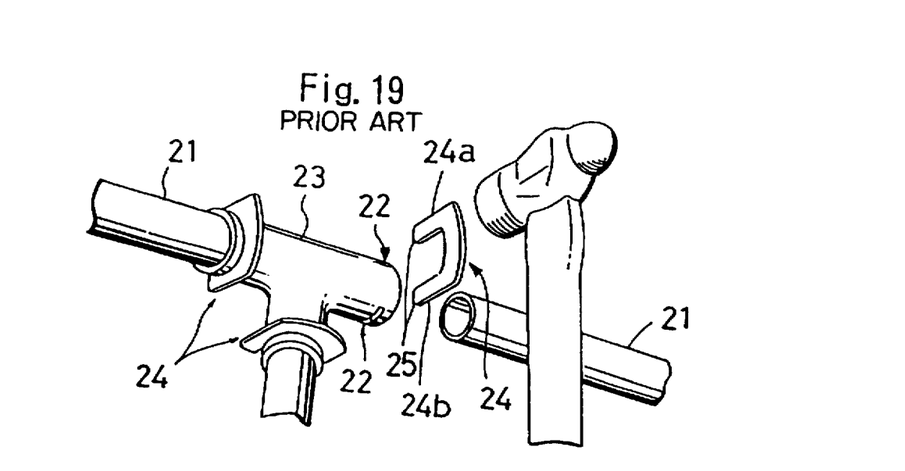
FIG. 19 is a view of explanatory of a conventional pipe joint unit.

A pipe joint unit of the foregoing type has been disclosed in, for example, FIG. 19 of Japanese Patent Utility Model Application Laid-Open No. Hei. 5-6291, the pipe joint unit comprising a body 23 thereof having two slits 22,22 facing the surface of a bayonet pipe 21 and opened in the two side portions thereof with respect to the axis of the pipe 21; and a key member 24 which is inserted and driven into the two slits 22,22 and formed into a U-shape facing side. The distance between securing members 24a and 24b of the key member 24 opposing each other is made to be somewhat shorter than the diameter of the pipe 21. Moreover, the securing members 24a and 24b have corresponding tapered portions 25 in the leading end portions thereof which are in contact with the surface of the pipe 21 in the initial stage of a driving operation and then gradually bite the surface of the pipe 21 as the driving operation proceeds.

With a pipe joint unit of the type having the foregoing structure, the pipe 21, to be joined, is inserted into the body 23 of the pipe joint unit, followed by inserting the key member 24 into the slits 22,22 of the body 23 of the pipe joint unit, followed by repeatedly striking the key member 24 with a hammer to cause the tapered portions 25,25 of the key member 24 to locally compress and deform the surface of the pipe 21 so as to cause the tapered portions 25,25 to bite the compressed and deformed portions. Then, the securing members 24a and 24b are secured to the bitten surface portions. Thus, the pipe 21 is joined to the body 23 of the pipe joint unit.

However, a pipe joint unit of the type having the foregoing structure comprising the key member 24 formed into the U-shape facing side and arranged to compress and deform the surface of the pipe involves the force for driving the key member 24 being undesirably dispersed into the two securing members 24a and 24b. Therefore, the key member 24 must be repeatedly and strongly struck by greatly swinging a hammer. As a result, there arises a problem of a heavy labor and an excessively long time being taken to drive the key member 24.

Since the securing members 24a and 24b can easily be broadened in opposite directions as the driving operation proceeds, the key member 24 must have a wide shape to strengthen the base of the securing members 24a and 24b, causing the key member 24 considerably to project over the surface of the pipe 21. Thus, there is a risk that the clothes or the human body can be caught by the projecting portion. Moreover, there arises a problem in that a member for supporting the pipe 21 must have a strong structure because the support member is struck violently when the driving operation is performed in such a manner that the key member 24 is struck strongly. In addition, a large space is required around the pipe 21 and the pipe joint unit to drive the key member 24 with the hammer which is swung greatly. Therefore, if the space for performing the piping operation is too small or if the pipe arrangement is too complicated, there arises another problem in that the operation for joining the pipes cannot easily be performed.

When the key member 24 is driven, it is critical for the key member 24 to be driven straight so as to be attached and secured onto the surface of the pipe 21. If the key member 24 is erroneously struck, for example, if the upper corner of the key member 24 is struck, the lower securing member 24b is brought to be out of the slit 22. As a result, only the upper securing member 24a compresses and deforms the pipe 21. In the foregoing case, slight vibration of the pipe 21 results in the key member 24 being separated, thus causing a critical problem of separation of the pipe 21 to take place with a great possibility. Therefore, a considerable skill has been required to drive the key member 24.

SUMMARY OF THE INVENTION

In view of the foregoing, an object of the present invention is to provide a pipe joint unit capable of quickly and reliably joining pipes to each other without skill, with small force and without a necessity of greatly swinging a hammer.

In order to achieve the foregoing object, the following technical means is employed in the present invention.

That is, a pipe joint unit according to the present invention is characterized by a body of the pipe joint unit having through holes each of which faces a portion of an inserted pipe in a direction of a tangent line; and key members to be driven into the through holes, wherein each of the key members has a tapered portion which is brought into contact with the surface of the pipe in an initial stage of a driving operation and which bites the surface of the pipe as the driving operation proceeds, and a secured portion to be secured to the bitten portion.

As a result of the characterized structure above, the pipe to be joined is inserted into the body of the pipe joint unit, a portion of the surface of the pipe is caused to face the through hole, the key member is inserted into the through hole, and the key member is struck with a hammer. Thus, as the key member is driven, the tapered portion of the key member, which is inserted into the through hole and tightly held in the through hole, locally compress and deform the surface portion of the pipe.

By repeatedly striking the key member, the tapered portion gradually bites the compressed and deformed portion of the pipe, and the secured portion is secured to the bitten portion. As a result, the pipe can be joined to the body of the pipe joint unit.

DETAILED DESCRIPTION OF THE PREFERRED EMBODIMENTS

Figure 1:
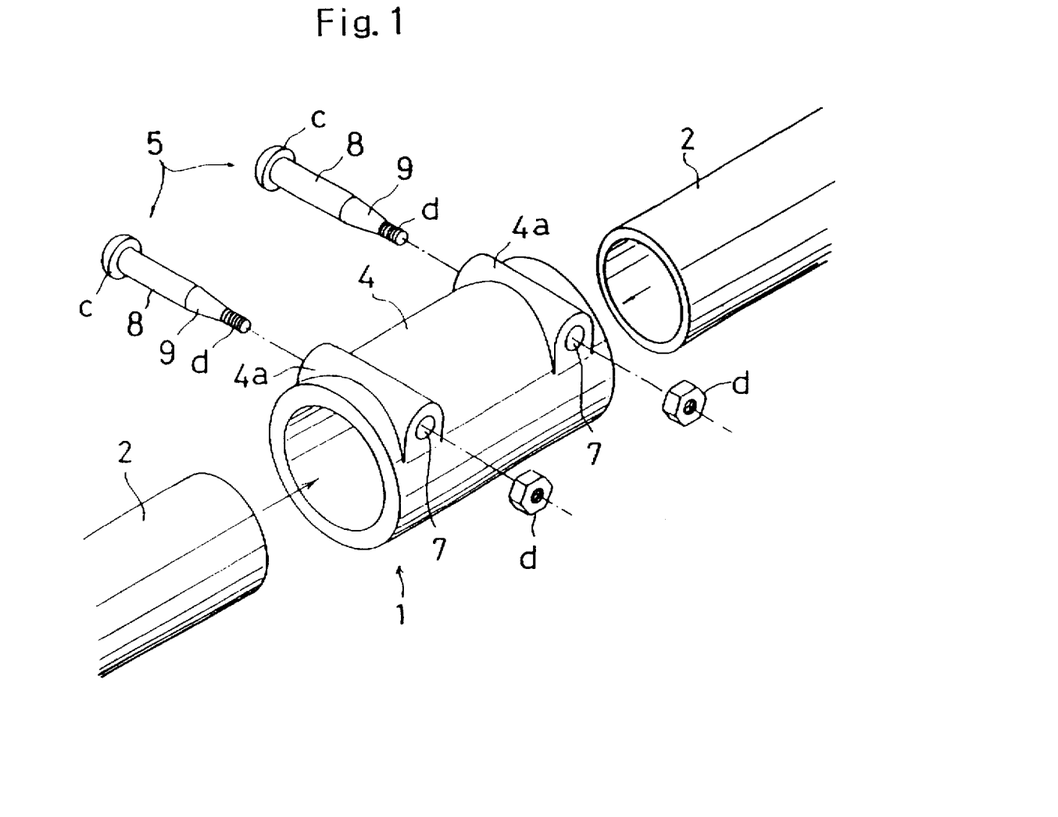
FIG. 1 is an exploded perspective view of a pipe joint unit according to a first embodiment of the present invention.
Figure 2:
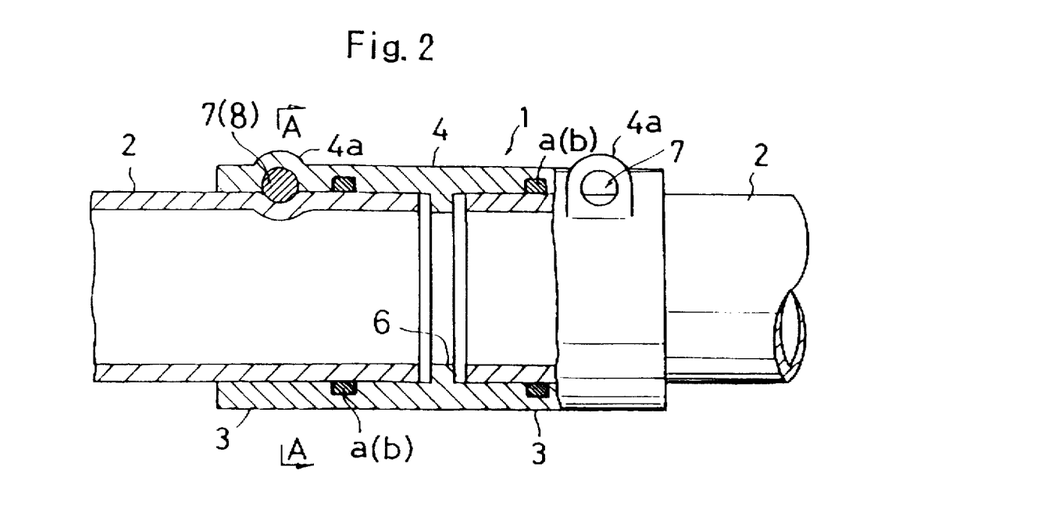
FIG. 2 is a cross sectional view showing an essential portion of the pipe joint unit and having a right hand portion showing a state before a key member is driven.
Figure 3:
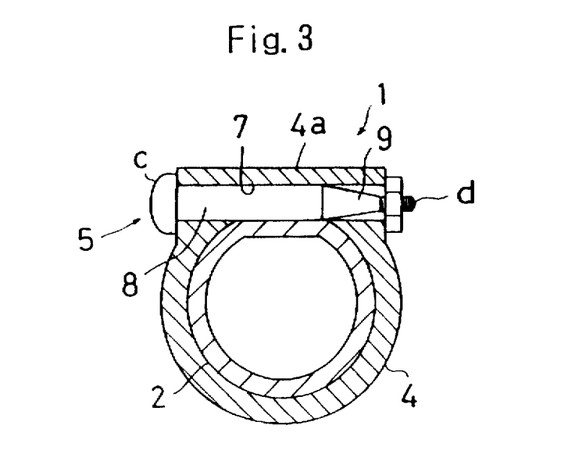
FIG. 3 is a cross sectional view taken along line A—A shown in FIG. 2.
Figure 4:
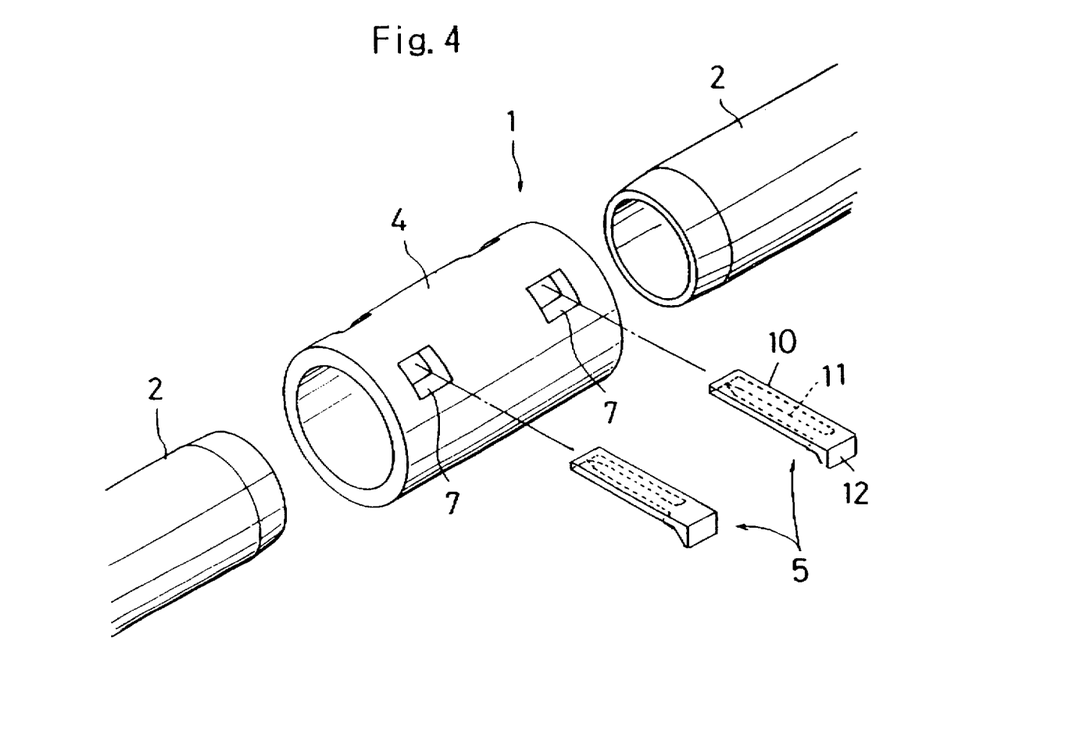
FIG. 4 is an exploded and perspective view of a pipe joint unit according to a second embodiment of the present invention.
Figure 5:
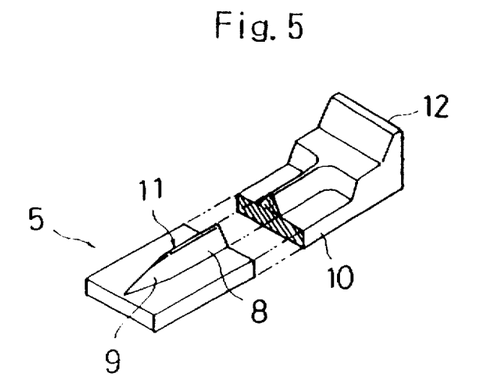
FIG. 5 is a partially broken perspective view of a key member.
Figure 6:
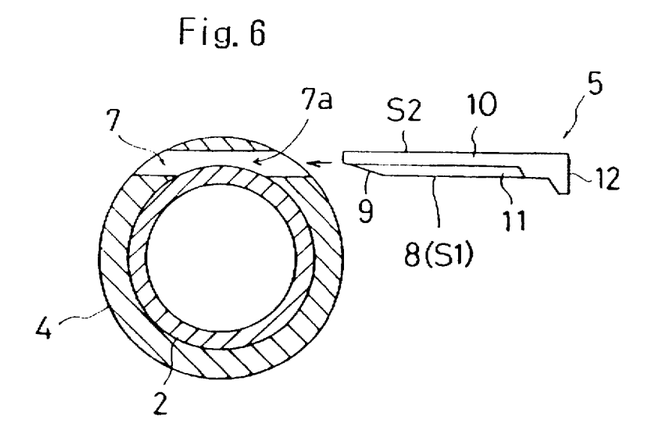
FIG. 6 is a cross sectional view of the pipe joint unit in a state before the key member is driven.
Figure 7:
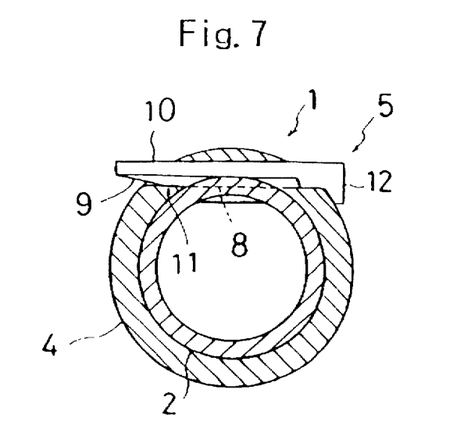
FIG. 7 is a cross sectional view of the pipe joint unit in a state where the key member has been driven.

Preferred embodiments of the present invention will now be described with reference to the drawings. FIGS. 1 to 3 show a pipe joint unit 1 according to a first embodiment of the present invention. The pipe joint unit 1 is arranged to join pipes 2, for example, metal pipes, such as steel pipes or stainless steel pipes or those made of synthetic resin. The pipe joint unit 1 comprises a body 4 thereof, made of metal and having, on the two sides thereof, receptacle pipe portions 3 for receiving the pipes 2; and key members 5 arranged to bite the surfaces of the pipes 2 inserted into the receptacle pipe portions 3 to join and secure the pipes 2 to the body 4 of the pipe joint unit 1 while preventing separation of the pipes 2.

Specifically, position regulating members 6 for regulating the positions of the inserted pipes 2 are disposed in the receptacle pipe portions 3 of the body 4 of the pipe joint unit 1. Moreover, recesses b for receiving and supporting O-rings a for sealing the inserted pipes 2 are formed on the two sides of the position regulating members 6. Furthermore, expanding portions 4a formed perpendicular to the axis of the pipes 2 and each having a semicircular shape are formed on the outer surface portions at positions adjacent to the ends of the pipe joint unit 1 as compared with the recesses b, the expanding portions 4a being formed in parallel to each other. The expanding portions 4a have circular through holes 7 which face portions of the surfaces of the pipes 2 inserted into the receptacle pipe portions 3, the through holes 7 facing the portions of the surfaces of the pipes 2 in directions of tangent lines.

The key members 5 are driven into the through holes 7. Each of the key members 5 has a secured portion 8 having a head portion c, the diameter of which is larger than that of the through hole 7, and formed by a pin having a circular cross section having a diameter corresponding to the diameter of the through hole 7; and a tapered portion 9 arranged to be brought into contact with the surface of the pipe 2 when the key member 5 is inserted into the through hole 7, the tapered portion 9 being formed into a circular cone shape having flat ends. Moreover, the key member 5 has a thread portion d formed in the leading end portion of the tapered portion 9. The total length of the secured portion 8 and the tapered portion 9 is slightly shorter than the length of the expanding portion 4a.

In the pipe joint unit 1, the pipes 2 are joined to the body 4 of the pipe joint unit 1 as follows.

Initially, the pipe 2 is inserted into the receptacle pipe portion 3 of the body 4 of the pipe joint unit 1 until an end of the pipe 2 passes the through hole 7 and the O-ring a to be positioned near the position regulating member 6 or the same is brought into contact with the position regulating member 6. Thus, a portion of the pipe 2 is caused to face the through hole 7 of the body 4 of the pipe joint unit 1 (see the right hand portion of FIG. 2).

Whether or not insertion of the pipe 2 has been performed as desired is determined sensuously. In order to accurately insert the pipe 2, it is preferable that a marking formed by, for example, color painting, be formed on the surface of the pipe 2 at a position determined by estimating the designed length of insertion of the pipe 2.

Thus, when the pipe 2 has been inserted into the body 4 of the pipe joint unit 1 as desired, the marking can visually be confirmed through the through hole 7 formed in the body 4 of the pipe joint unit 1.

Then, the key member 5 is inserted into the through hole 7, and then the key member 5 is struck with a hammer in a state where the tapered portion 9 of the key member 5 is brought into contact with the surface of the pipe 2.

As the key member 5 is driven, the tapered portion 9 of the key member 5 inserted into the through hole 7 and thus tightly held within the same locally compresses and deforms the surface of the pipe 2. As a result, the tapered portion 9 bites the compressed and deformed portion.

By repeatedly striking the key member 5, the tapered portion 9 gradually bites the compressed and deformed portion of the surface of the pipe 2. Then, the or securing member 8 is secured to the bitten surface portion so that the pipe 2 is joined and secured to the body 4 of the pipe joint unit 1 in such a manner that separation is prevented.

Then, a nut d is, if necessary, set to the thread portion d by means of threads so that separation of the key member 5 is prevented. Thus, insertion and joining of the pipe 2 to the body 4 of the pipe joint unit 1 are completed.

The foregoing structure is not different from the conventional pipe joining method which uses the key member formed into a U-shape facing side because the secured portion is secured to the bitten surface portion. However, since the key member 5 to be struck is only a single object which is tightly held in the through hole 7, striking force can be concentrated into one key member 5 when the key member 5 is driven. Therefore, the necessity of greatly swinging a hammer to strongly strike the key member 5 can be eliminated because the surface of the pipe 2 can be locally compressed and deformed by the tapered portion 9.

Thus, the pipe joint unit 1 having the foregoing structure enables a not-skilled person to easily and quickly join the pipe 2 to the body 4 of the pipe joint unit 1 with small force. Since the hammer is not required to be swung greatly, the pipes 2 can easily be joined even if the space in which the piping operation is performed is small or even if the pipe arrangement is complicated. Since the member for supporting the pipe 2 is not struck considerably, the structure of the support member can be simplified. Since substantially the overall body of the key member 5 is accommodated in the through hole 7, an advantage can be realized in securing safety.

With reference to FIGS. 4 to 7, a pipe joint unit 1 according to a second embodiment of the present invention will now be described. The pipe joint unit 1 according to this embodiment has a structure such that a through hole 7 facing a portion of the surface of a bayonet pipe 2 in a direction of a tangent line is formed into a rectangular shape. A key member 5 comprises a body 10 formed into a flat and rectangular shape corresponding to a through hole portion (a portion in which the area of the through hole 7 is made to be the smallest when the pipe 2 is inserted) 7a of the through hole 7 except a portion shielded by the pipe 2 when the pipe 2 is inserted into the receptacle pipe portion 3 of the body 4 of the pipe joint unit 1, that is, a cross sectional shape which corresponds to a cross sectional shape of the portion in which the area of the through hole 7 is made to be the smallest when the pipe 2 is inserted. The key member 5 further comprises a securing member 11 having a small width and formed in the central portion of one side of the body 10 of the key member 5, the central portion being a central portion in the widthwise direction of the body 10 of the key member 5. The securing member 11 is arranged to locally compress and deform the surface of the pipe 2 that faces the through hole 7 when the key member 5 is struck so as to secure the pipe 2. The key member 5 further comprises a member 12 having a surface to be struck, the member 12 being formed at an end of the body 10 of the key member 5 in the lengthwise direction and having a size larger than that of the through hole 7.

A portion of the securing member 11 except the leading end thereof forms the foregoing secured portion 8, the leading end having a tapered portion 9 which is brought into contact with the surface of the pipe 2 when the leading end of the body 10 of the key member 5 has been inserted into the through hole portion 7a. The tapered portion 9 is arranged to gradually bite the surface of the pipe 2 as the key member 5 is driven.

Although the pipe joint unit 1 having the foregoing structure is different from the pipe joint unit 1 shown in FIGS. 1 to 3 in the structure of the key member 5 and the shape of the through hole 7, the state and operation of joining the pipe 2 to the body 4 of the pipe joint unit 1 are not different from the same. Therefore, the description of the state and operation for joining the pipe 2 is omitted here to prevent an overlap.

Figure 8:
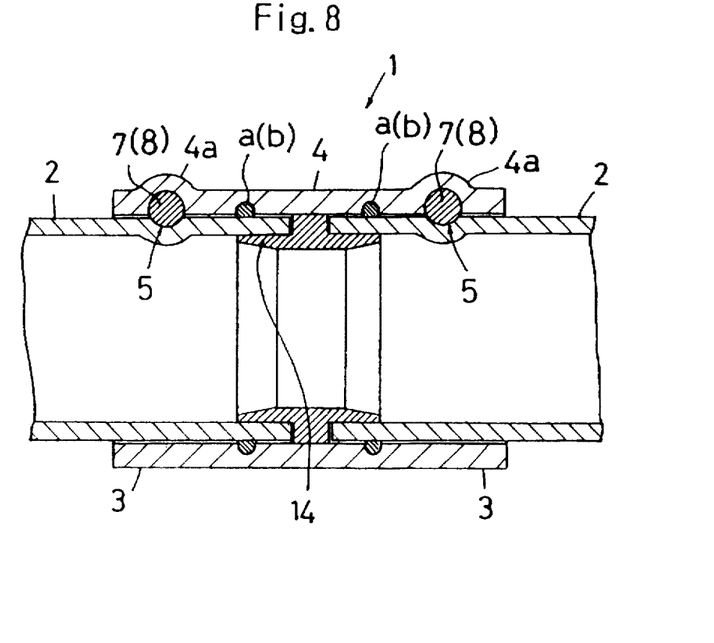
FIG. 8 is a cross sectional view of a pipe joint unit according to a third embodiment of the present invention in a state where the key members have been driven.

Referring to FIG. 8, a pipe joint unit 1 according to a third embodiment of the present invention will now be described. The pipe joint unit 1 according to this embodiment is characterized by an O-ring a provided for the purpose of sealing the pipe 2, the O-ring a being disposed in the receptacle pipe portion 3 at a position inner than the through hole 7 in the body 4 of the pipe joint unit 1. Moreover, a core 14 for, from inside, supporting an end of the pipe 2 is integrally formed with the inner portion of the body 4 of the pipe joint unit 1. The core 14 is formed concentrically with respect to the receptacle pipe portion 3 and has the outer shape which is formed into a cylindrical shape formed in parallel to the inner surface of the receptacle pipe portion 3. The inner surface of the core 14 is tapered in order to minimize resistance generating when fluid flows in the core 14. Since the residual structures are the same as those of the first embodiment, the same structures are omitted from description.

The foregoing structure is arranged such that the end of the pipe 2 is supported by the core 14 from the inside in the state where the pipe 2 is inserted into the receptacle pipe portion 3 of the body 4 of the pipe joint unit 1. Therefore, even if the pipe wall portions positioned on the two sides of the key member 5 are somewhat deflected when the pipe 2 is locally compressed and deformed by driving the key member 5 into the through hole 7, deflection of the pipe wall portion adjacent to the O-ring a can be prevented by the core 14. Therefore, the contact between the O-ring a and the outer surface of the pipe 2 can be stabilized.

That is, if only the portion of the pipe wall that is brought into contact with the key member 5 is deformed when the key member 5 is driven into the through hole 7 formed in the body 4 of the pipe joint unit 1 to locally compress and deform the pipe 2, no problem arises. However, the pipe wall portions on the two sides of the key member 5 can easily be deflected in actual. If the distance from the through hole 7 and the O-ring a is too short, deflection of the pipe wall generating when the key member 5 is driven reaches the position at which the O-ring a is disposed. As a result, the contact between the O-ring a and the outer surface of the pipe 2 are loosened, thus resulting in that the sealing performance of the O-ring a deteriorates. In the foregoing case, water leakage will take place.

To prevent the foregoing problem, it might be feasible to employ a structure in which the distance from the through hole 7 to the O-ring a is elongated satisfactorily to protect the O-ring a from an influence of the deflection of the pipe wall taking place when the key member 5 is driven. However, the foregoing structure involving the distance from the through hole 7 to the O-ring a being elongated results in the length of the receptacle pipe portion 3 in the body 4 of the pipe joint unit 1 being elongated excessively. As a result, the pipe joint unit 1 is elongated excessively.

On the other hand, the core 14 for, from inside, supporting the end portion of the pipe 2 formed in the body 4 of the pipe joint unit 1 is able to protect the O-ring a from the influence of the deflection of the pipe wall taking place when the key member 5 is driven even if the distance from the through hole 7 to the O-ring a is shortened. Thus, excellent sealing performance can be obtained without a necessity of elongating the length of the pipe joint unit 1.

Although the embodiment shown in FIG. 8 has been described about the structure comprising the body 4 of the pipe joint unit 1 and key member 5 that have the same structures as those of the first embodiment shown in FIGS. 1 to 3 (the pipe joint unit 1 comprising the key members 5 each having a circular cross sectional shape), the body 4 of the pipe joint unit 1 and key member 5 may, of course, have the same structures as those according to the second embodiment shown in FIGS. 4 to 7.

Figure 9:
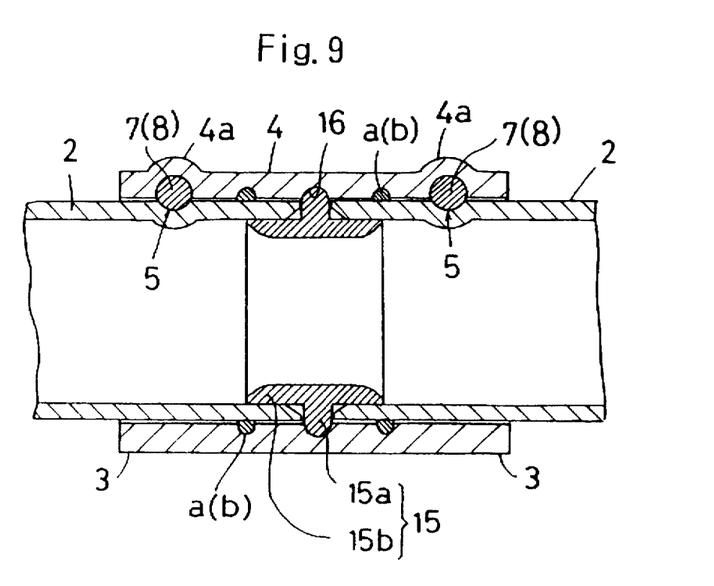
FIG. 9 is a cross sectional view of a pipe joint unit according to a four embodiment of the present invention in a state where the key members have been driven.
Figure 10:
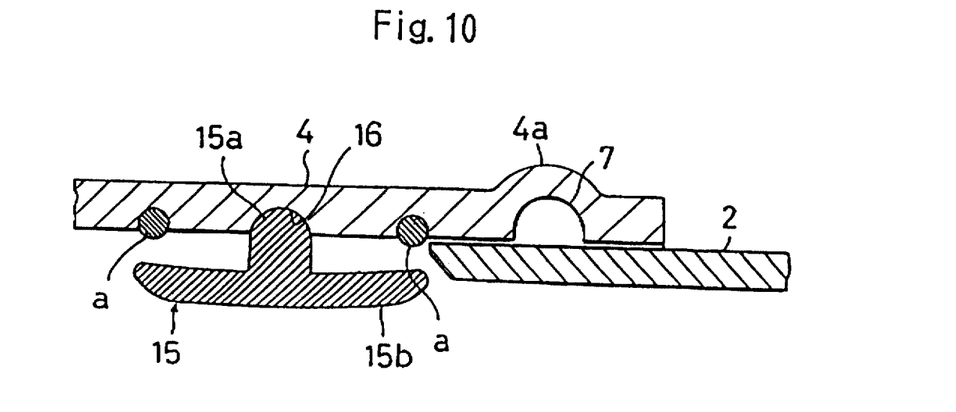
FIG. 10 is a cross sectional view showing an essential portion before the key member is driven.
Figure 11:
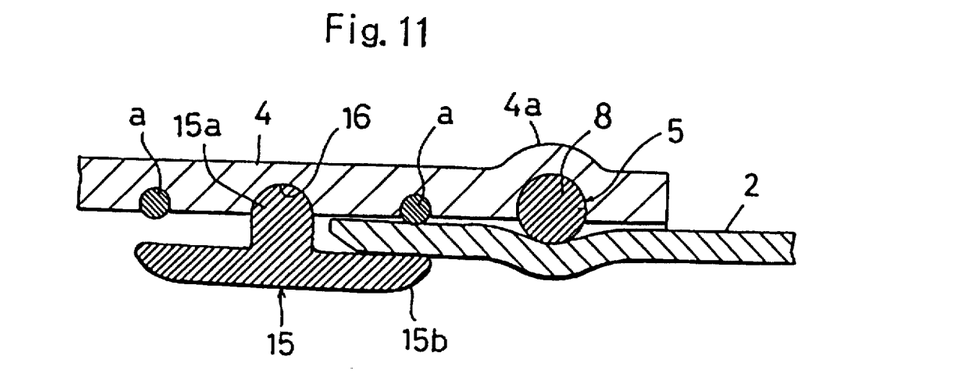
FIG. 11 is a cross sectional view showing an essential portion after the key member has been driven.

Referring to FIGS. 9 to 11, a pipe joint unit 1 according to a fourth embodiment of the present invention will now be described. The pipe joint unit 1 according to this embodiment is characterized by an O-ring a disposed in the receptacle pipe portion 3 at a position inner than the through hole 7 in the body 4 of the pipe joint unit 1, the O-ring a being provided for the purpose of sealing the pipe 2. Moreover, a core-type packing 15 pressing against the inner surface of the end of the pipe 2 is disposed in the body 4 of the pipe joint unit 1. The core-type packing 15 is made of an elastic material, such as rubber or synthetic resin, the core-type packing 15 having an annular portion 15a to be received by a positioning annular groove 16 formed in the inner surface of the body 4 of the pipe joint unit 1; and cylindrical portions 15b integrally formed at the inner ends of the annular portion 15a to extend in the axial directions. The cylindrical portions 15b elastically come in contact with the inner surface of the pipe 2 to exhibit the sealing performance.

As a result of the foregoing structure, sealing performance can be realized from both of the O-ring a which is in contact with the outer surface of the pipe 2 and the core-type packing 15 which is in contact with the inner surface of the pipe 2. Therefore, excellent sealing performance can be realized.

It is preferable that the inner ends of the pipe 2 be chamferred in order to enable the pipe 2 to smoothly be inserted between the core-type packing 15 and the receptacle pipe portion 3 of the body 4 of the pipe joint unit 1. Although the cylindrical portion 15b of the core-type packing 15 may have a cylindrical outer shape running parallel to the inner surface of the receptacle pipe portion 3, this embodiment, as shown in FIG. 10, has a structure such that the cylindrical portion 15b is warped outwards in the direction of the diameter thereof. Thus, the leading end of the cylindrical portion 15b is intended to strongly and reliably come in contact with the inner surface of the pipe 2. Although the body 4 of the pipe joint unit 1 and key member 5 according to this embodiment have the same structures (the pipe joint unit 1 comprising the key members 5 each having a circular cross sectional shape) as those according to the first embodiment shown in FIGS. 1 to 3, the body 4 of the pipe joint unit 1 and key member 5 may, of course, have the same structures as those according to the second embodiment shown in FIGS. 4 to 7.

Figure 12:
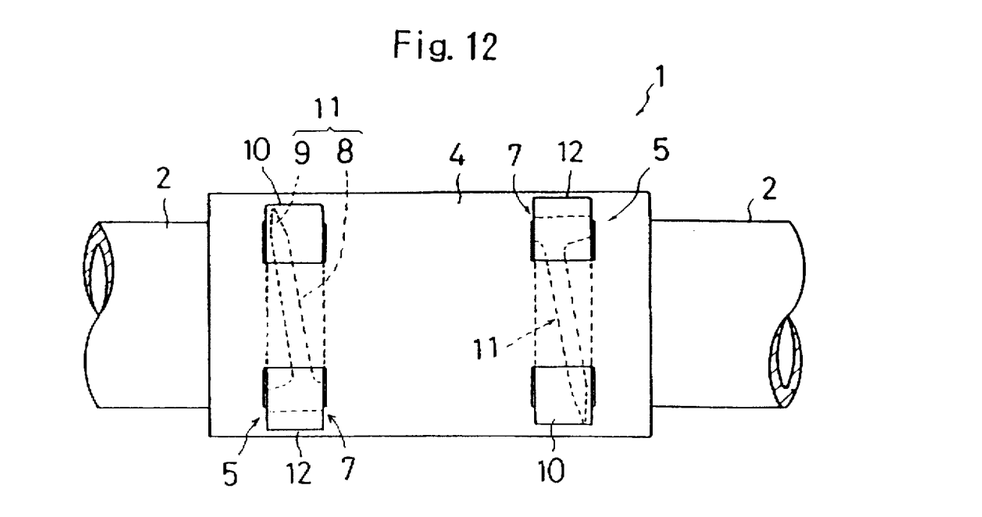
FIG. 12 is a plan view of a pipe joint unit according to a fifth embodiment of the present invention.
Figure 13:
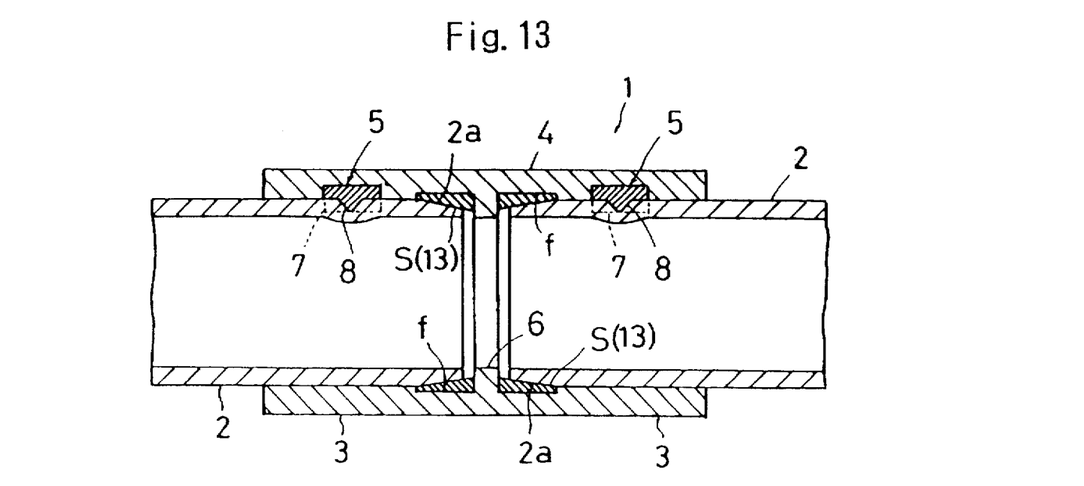
FIG. 13 is a vertical side view of the pipe joint unit.
Figure 14:
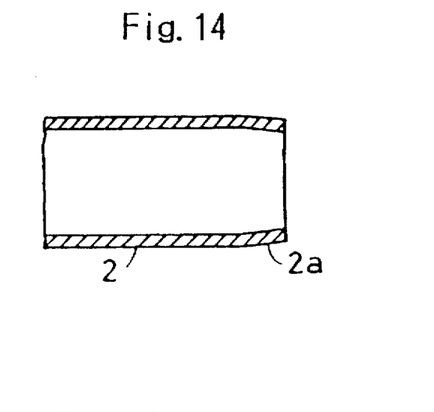
FIG. 14 is a partial cross sectional view showing a pipe having a drawn insertion end.

Referring to FIG. 12, a pipe joint unit 1 according to a fifth embodiment of the present invention will now be described. The pipe joint unit 1 is an improvement of the pipe joint unit 1 according to the second embodiment so as to be satisfactorily adaptable to pipes 2 each having an outer surface of the end portion to be inserted which is formed into a tapered portion 2a tapered toward the leading end thereof by, for example, grinding with sander as shown in FIG. 13 or pipes 2 each having a tapered portion 2a tapered toward the leading end thereof by drawing with a squeezing machine or the like as shown in FIG. 14.

Figure 15:
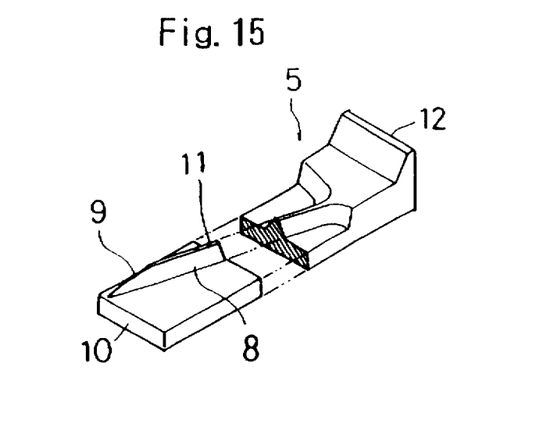
FIG. 15 is a partially broken perspective view of the key member.

Specifically, an annular recess f is formed adjacent to the position regulating member 6 of the body 4 of the pipe joint unit 1. Moreover, a sealing means (which is made of, for example, hard or soft synthetic resin or rubber and which is a packing in this embodiment) 13 is provided in the annular recess f, the sealing means 13 having an inner surface formed into a tapered surface S corresponding to the tapered portion 2a of the pipe 2 tapered toward the leading end. Thus, when the pipe 2 is moved into the direction of insertion, sealing effect is realized between the pipe 2 and the sealing means 13. Moreover, a key member 5 is provided which comprises, as shown in FIG. 15, a securing member 11 forming a tapered portion 9 and a secured portion 8 which is somewhat inclined with respect to the axis of the through hole 7 in a direction of the axis of the pipe 2. When the key member 5 is driven, the pipe 2 is moved in the direction of insertion.

That is, thrust force for moving the pipe 2 in the direction of the axis of the pipe 2 when the key member 5 is driven is generated on the inclined surface of the securing member 11 (the tapered portion 9 and the secured portion 8) so that a sealing effect thanks to the "taper-touch manner" is obtained between the tapered portion 2a of the pipe 2 tapered toward the leading end thereof and the tapered surface S of the sealing means 13.

As a result of the foregoing structure, the direction of a portion of the force for driving the key member 5 can be changed into a direction in which the tapered portion 2a of the pipe 2 tapered toward the leading end thereof is pressed against the tapered surface S of the sealing means 13. Therefore, the pipe 2 and the sealing means 13 fit each other. Thus, excellent sealing performance can be realized.

Although the sealing means 13 is, for example, the packing in the foregoing embodiments, another structure may be employed in which the annular recess f is not formed, but the body 4 of the pipe joint unit 1 has the tapered surface S so as to be formed into the sealing means 13 so that a metal touch sealing effect is realized between the tapered portion 2a tapered toward the leading end and the tapered surface S when the pipe 2 is moved into the direction of insertion. In the foregoing case, for example, a liquid sealing material is applied to the surfaces which are in metal touch contact with each other.

Figure 16:
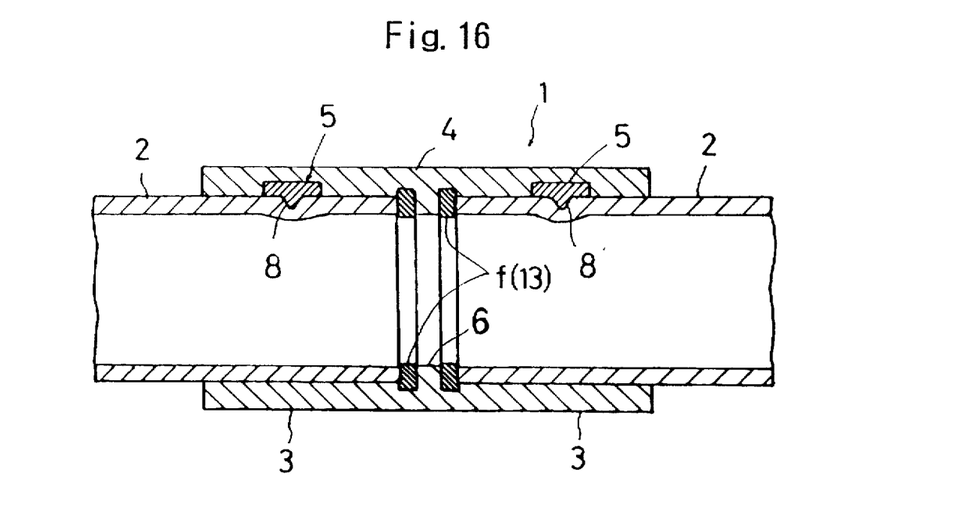
FIG. 16 is a vertical side view of a pipe joint unit adapted to another sealing method.

The pipe joint unit 1 according to the fifth embodiment can satisfactorily be adapted to the pipe 2 having the tapered portion 2a as the insertion end tapered toward the leading end. The pipe 2 is not limited to this. As shown in FIG. 16, the sealing means 13 may have a structure such that, for example, a flat packing is provided in the annular recess f in a state where the flat packing is in contact with the position regulating member 6 so that the end surface of the pipe 2 is pressed against the sealing means 13 as the pipe 2 is moved into the insertion direction. In the foregoing case, the necessity of machining the insertion end of the pipe 2 into the tapered portion tapered toward the leading end can be omitted preferably.

Figure 17:
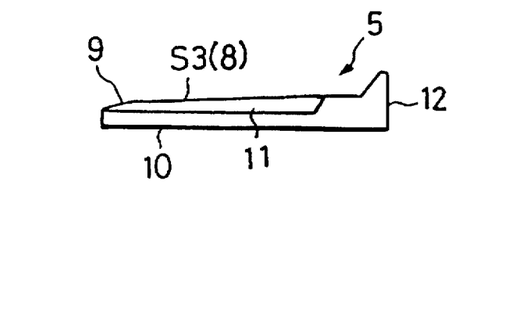
FIG. 17 is a side view showing another key member.
Figure 18:
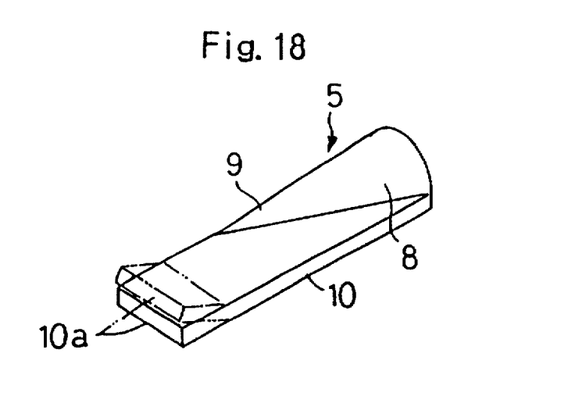
FIG. 18 is a perspective view of another key member.

FIGS. 17 and 18 show other examples of the key member 5. The key member 5 shown in FIG. 17 has a modification of a portion of the key member 5 according to the second and fifth embodiments. As can be understood from FIG. 6, the second and the fifth embodiments have the structure such that edge line S1 of the secured portion 8 formed by the tapered portion 9 and arranged to be secured to the bitten surface of the pipe 2 runs parallel to sliding surface (the bottom surface) S2 of the body 10 of the key member 5. The key member 5 shown in FIG. 17 has the edge line of the secured portion 8 which is formed into a tapered portion S3 inclined gently in order to cause the secured portion 8 to further bite the bitten portion of the surface of the pipe 2.

In the case where the key member 5 shown in FIG. 17 is employed in the second embodiment, the securing member 11 (the tapered portion 9 and secured portion 8) is formed to run parallel to the lengthwise direction of the body 10 of the key member 5. In the case where the key member 5 is employed in the fifth embodiment, the securing member 11 (the tapered portion 9 and secured portion 8) is formed to incline with respect to the lengthwise direction of the body 10 of the key member 5. Each of the foregoing structures may be arranged to have another structure (not shown) in which the tapered portion S3 formed along the edge line of the secured portion 8 and inclined gently is elongated to the leading end of the securing member 11 so as to cause the tapered portion 9 and the tapered portion S3 formed along the edge line of the secured portion 8 and inclined gently to have the same inclination.

A key member 5 shown in FIG. 18 is a partial modification of the key member 5 for use in the pipe joint unit 1 according to the fifth embodiment so as to cause the secured portion 8 of the key member 5 to have an improved biting function. That is, the tapered portion 9, arranged to bite the surface of the pipe 2 as the key member 5 is driven, and the secured portion 8, to be secured to the portion of the surface of the pipe 2 bitten by the tapered portion 9, are formed into a continuous semi-conical shape. Moreover, the center of the semi-conical shape is somewhat inclined with respect to the axis of the through hole 7 into a direction of the axis of the pipe 2. As the key member 5 is driven, the secured portion 8 is caused to further bite the portion of the surface of the pipe 2 which is bitten by the tapered portion 9. During this, the pipe 2 is moved into the insertion direction. The leading end of the body 10 of the key member 5 is allowed to project over the through hole 7 in such a manner that a projecting portion 10a is deformed by bending in order to prevent separation of the key member 5.

According to the structures shown in FIGS. 17 and 18, the wall of the pipe 2 is gradually deformed as the key member 5 is driven. Therefore, the pipe 2 can be joined to the body 4 of the pipe joint unit 1 with smaller force.

Although each of the foregoing embodiments has the structure such that joining is performed by driving one key member 5 into one pipe 2 which is the subject to be joined, another joining structure may be employed in which a plurality of through holes 7 are, at predetermined intervals, formed in the circumferential direction of the body 4 of the pipe joint unit 1 and the key member 5 is driven into each of the through holes 7 so that a plurality of portions of the surface of the pipe 2 are compressed and deformed.

Since the foregoing key member 5 is, while being held in the through hole 7, tightly held between the surface of the pipe 2, which is compressed and deformed, and the through hole 7, a special separation preventive means, such as the nut d or bending of the projecting portion 10a, is not required.

The joining structures are arranged in such a manner that the key member is struck to locally compress and deform the surface of the pipe so as to secure the secured portion to the compressed and deformed portion in such a manner that the key member to be struck is formed into the single member which is tightly held in the through hole so as to concentrate the striking force. Therefore, the necessity of strongly strike the key member by greatly swinging a hammer can be eliminated. Therefore, the pipe can easily and quickly be joined to the body of the pipe joint unit by a person who has no skill.

Since the necessity of greatly swinging the hammer can be eliminated, pipes can easily be joined to each other even if the pipe joining space is small or the pipe arrangement is complicated. Since the pipe support member is not struck considerably, the structure of the support member can be simplified.

Since the wall of the pipe is deformed gradually when the key member is driven, the pipe can be joined to the body of the pipe joint unit with smaller force.

Ever if the distance from the through hole to the O-ring is shortened, the O-ring is not affected by deflection of the pipe wall when the key member is driven. Thus, excellent sealing performance can be obtained without a necessity of elongating the pipe joint unit.

According to claim 5, since the sealing function can be obtained from both of the O-ring which is in contact with the outer surface of the pipe and the core-type packing which is in contact with the inner surface of the pipe, excellent sealing performance can be obtained.

According to claim 6, since the direction of a portion of the force for driving the key member can be changed into a direction in which the pipe is pressed against sealing means, the pipe and the sealing means fit satisfactorily and excellent sealing performance can be obtained.

What is claimed is:

1. A pipe joint unit for joining a pair of inserted pipes comprising:
    a body of said pipe joint unit having through holes each of which faces a portion of an inserted pipe in a direction along a tangent line; and
    separate key members to be driven into said through holes, wherein each of said key members has a body portion that supports a securing rib member that extends from the body portion and includes, adjacent one end of the body portion, a tapered portion which is brought into contact with the surface of the pipe as the driving operation proceeds, the body portion is wider than the securing rib member and includes adjacent the other end of the body portion a contact surface that is larger than said through holes and is aligned with the securing rib member, the contact surface is susceptible to receiving a driving force, whereby the securing rib member is secured to the pipe when the contact surface is driven to a position adjacent the pipe and cannot be driven further through the hole.

2. A pipe joint unit according to claim 1, wherein an O-ring for sealing the pipe is disposed in said body of said pipe joint unit at a position between said through holes.

3. A pipe joint unit according to claim 2, wherein a core-type packing, which is pressed against the surface of an end of a pipe, is disposed in said body of said pipe joint unit.

4. A pipe joint unit according to claim 1, wherein sealing means for sealing the pipe when the pipe has been moved in an insertion direction is disposed in said body of said pipe joint unit, and said securing rib member is inclined with respect to an axis of said through hole in a direction of an axis of the pipe in such a manner that the pipe is moved in an insertion direction into said body as said key member is driven.

5. A pipe joint unit for interconnection with a pair of pipes comprising:
    a body member having an opening with a longitudinal axis extending from one end to the other end of the body member, the opening being of a size to slidingly extend over an end and an outer diameter of the pipes, the body member including a pair of approximately rectangular apertures on either side of the body member extending into the opening and aligned to provide axes between matching apertures that are nonparallel with the longitudinal axis of the opening;
    sealing means positioned within the opening and between the respective axes of the apertures and of a configuration to sealingly contact the end of the pipes; and
    a pair of elongated key members configured to lit within the respective apertures and extend through the body member and a portion of the opening, wherein the key members have a substantially rectangular configuration compatible in size with the approximately rectangular apertures with a raised securing rib extending diagonally along their length, the location of the apertures and the size of the key members cause the respective key members to deform any pipes of approximately the size of an inner diameter of the opening mounted within the body member, while the diagonal arrangement of the raised securing rib forces the pipes in a progressively tighter sealing contact with the sealing means, wherein the key members will secure the pipe joint unit to the pipes, and the sealing member will seal the pipes.

6. A pipe joint unit according to claim 5 where the sealing means further includes a core member of approximately an annular cylindrical configuration with a central rib of a dimension approximating the internal diameter of the opening of the body member, the annular cylindrical configuration having an outer diameter approximating an inner diameter of the pipes.

7. A pipe joint unit according to claim 6 wherein the core member is cylindrical with an annular outer rib.

8. A pipe joint unit according to claim 7 wherein the body member includes an annular groove of a dimension to sealing receive the annular outer rib of the core member.

9. A pipe joint unit according to claim 8 wherein the core member has a convex inner annular surface to encourage a sealing outer annular surface contact with an inner surface of a pipe.

10. A pipe joint unit according to claim 5 wherein the raised securing rib has a conical configuration.

11. A pipe joint unit according to claim 5 wherein the body member has a pair of annular grooves and a respective O-ring is mounted in each of the grooves for providing a sealing contact with an exterior of each pipe.

12. A pipe joint unit for interconnection with a pair of pipes comprising:

a body member having an opening with a longitudinal axis extending from one end to the other end of the body member, the opening being of a size to slidingly extend over an end and an outer circumference of the respective pipes, the body member including a pair of approximately rectangular apertures on either side of the body member extending interiorly through a portion of the body member and into the opening and aligned to provide axes between matching apertures that are nonparallel with the longitudinal axis of the opening;

first sealing means positioned within the opening and between the respective axes of the apertures and of a configuration to sealingly contact the respective ends of the pipes when they are abutted against the first sealing means;

second sealing means positioned within the body member and extending about respective outer circumferences of the pipes to sealingly contact the respective outer circumferences of the pipes when they are abutted against the first sealing means; and a pair of elongated key members configured to fit within the respective apertures and to extend through the body member and a portion of the opening wherein the key members are independent of each other and have a substantially rectangular cross-section configuration compatible in size with the approximately rectangular apertures of the body member with a raised securing rib projecting from the rectangular cross-section and extending along a length of each key member, the securing rib has a tapered portion adjacent one end of the respective key members, each key member has an enlarged striking surface at the other end, which is axially aligned with the securing rib, the location of the apertures and the size of the key members cause the respective securing ribs to deform any pipes of approximately the size of an inner diameter of the opening mounted within the body member, the securing rib is forced against the pipe by the corresponding rectangular aperture when a force is exerted against the striking surface on the key member to secure the pipe joint unit to the pipes, while the first and second sealing means will seal the connected pipes.

13. The pipe joint unit according to claim 12, wherein the pipes have inner circumferences and the first sealing means includes a cylindrical packing core of a dimension to extend within respective inner circumferences of the pipes.

14. The pipe joint unit according to claim 13, wherein the body member has an annular groove extending about the opening and the cylindrical packing core has an annular portion of a configuration to sealingly engage the body member annular groove.

15. The pipe joint unit according to claim 13, wherein the cylindrical packing core extends to a position facing the second sealing means so that respective pipes will be sealed on the respective outer and inner circumferences.

16. The pipe joint unit according to claim 15, wherein the cylindrical packing core has ends that are radially enlarged to provide a sliding sealing contact with the respective inner circumferences of the respective pipes.

17. A pipe joint unit for interconnection with a pair of pipes comprising:

a body member having an opening with a longitudinal axis extending from one end to the other end of the body member, the opening being of a size to slidingly extend over an end and an outer circumference of the respective pipes, the body member including a pair of approximately rectangular apertures on either side of the body member extending interiorly through a portion of the body member and into the opening and aligned to provide axes between matching apertures that are nonparallel with the longitudinal axis of the opening;

core means positioned within the opening and between the respective axes of the apertures and of a configuration to contact and support the respective ends of the pipes when they are abutted against the core means;

first sealing means positioned within the body member and extending about respective outer circumferences of the pipes to sealingly contact the respective outer circumferences of the pipes when they are abutted against the core means; and a pair of elongated key members configured to fit within the respective apertures and to extend through the body member and a portion of the opening wherein the key members are independent of each other and have a substantially rectangular cross-section configuration compatible in size with the approximately rectangular apertures of the body member with a raised securing rib projecting from the rectangular cross-section and extending along a length of each key member, the securing rib has a tapered portion adjacent one end of the respective key members, each key member has an enlarged striking surface at the other end, which is axially aligned with the securing rib, the location of the apertures and the size of the key members cause the respective securing ribs to deform any pipes of approximately the size of an inner diameter of the opening mounted within the body member, the securing rib is forced against the pipe by the corresponding rectangular aperture when a force is exerted against the striking surface on the key member to secure the pipe joint unit to the pipes, while the first sealing means will seal the connected pipes.

18. The pipe joint unit according to claim 17, wherein the core means includes an annular cylindrical body with an opening that is concentrically mounted within the opening of the body member, the cylindrical body is dimensioned to permit a portion of the cylindrical body to extend within each of the respective pipes.

19. The pipe joint unit according to claim 18, wherein the cylindrical body has tapered edges about its opening.

20. A pipe joint unit for interconnection with a pair of pipes, each having a tapered portion at a respective end, comprising:

a body member having an opening with a longitudinal axis extending from one end to the other end of the body member, the opening being of a size to slidingly extend over an end and an outer circumference of the respective pipes, the body member including a pair of approximately rectangular apertures on either side of the body member extending interiorly through a portion of the body member and into the opening and aligned to provide axes between matching apertures that are nonparallel with the longitudinal axis of the opening;

sealing means positioned within the opening and between the respective axes of the apertures and of a configuration to sealingly contact the respective tapered ends of the pipes when they are abutted against the sealing means; and a pair of elongated key members configured to fit within the respective apertures and to extend through the body member and a portion of the opening wherein the key members are independent of each other and have a substantially rectangular cross-section configuration compatible in size with the approximately rectangular apertures of the body member with a raised securing rib projecting from the rectangular cross-section and extending diagonally along a length of each key member, each key member has an enlarged striking surface at one end, the location of the apertures and the size of the key members cause the respective diagonal securing ribs to deform any pipes of approximately the size of an inner diameter of the opening mounted within the body member, the securing rib is forced against the pipe by the corresponding rectangular aperture when a force is exerted against the striking surface on the key member to secure the pipe joint unit to the pipes, while the diagonal arrangement of the raised securing ribs forces the pipes in a progressively tighter sealing contact with the sealing means, wherein the key members will secure the pipe joint unit to the pipes, and the sealing means will seal the pipes.

21. The pipe joint according to claim 20, wherein the body member has a pair of annular recesses and the sealing means includes a pair of annular sealing members of a configuration to respectively be mounted within the respective annular recesses, each sealing member has a tapered configuration to complement the tapered portion of the respective ends of the pipe.

22. In a pipe joint unit for interconnecting a pair of pipes having a body member with an opening to extend over an end and an outer circumference of the respective pipes, the body member including at least an aperture extending from one side to another side of the body member and into the opening, the improvement comprising:

a key member dimensioned to extend through the aperture of the body member, the key member has an approximately rectangular cross-section base with a raised securing rib projecting from the rectangular cross-sectional base for contacting a pipe, one end of the key member has an enlarged striking surface, the securing rib has a tapered portion at one end of said rectangular base opposite said enlarged striking surface and an inclined surface terminating adjacent the striking surface extending from the tapered position and terminating adjacent the striking surface, which is axially aligned with the securing rib, whereby a force is exerted against the striking surface can force the securing rib to deform and fasten a pipe within the body member.

23. In a pipe joint unit for interconnecting a pair of pipes having a body member with an opening to extend over an end and an outer circumference of the respective pipes, the body member including at least an aperture extending from one side to another side of the body member and into the opening, the improvement comprising:

a key member dimensioned to extend through the apertures of the body member, the key member has an approximately rectangular cross-sectional base with a semi-conical securing rib positioned above the base and terminating in a striking surface at one end of the key member, whereby a force exerted against the striking surface can force the securing rib to deform and fasten a pipe within the body member.

* * * * *